N. R. G. EKWALL.
PROTECTIVE GLASSES FOR FLYERS, CASTERS, WELDERS, ETC.
APPLICATION FILED JAN. 11, 1921.
1,415,536.
Patented May 9, 1922
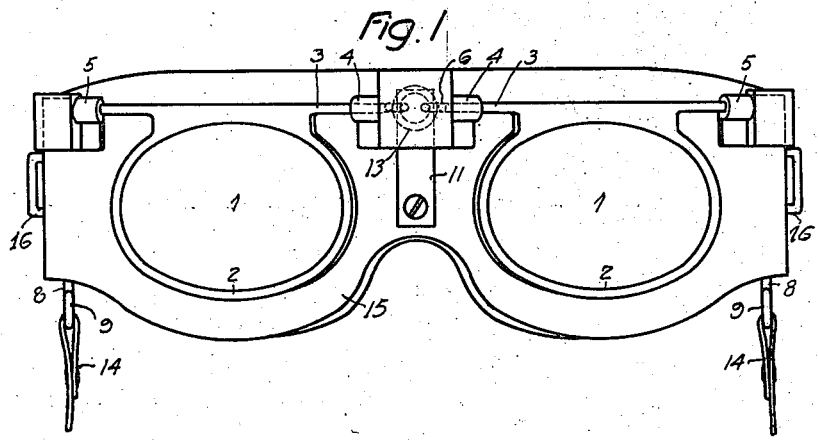
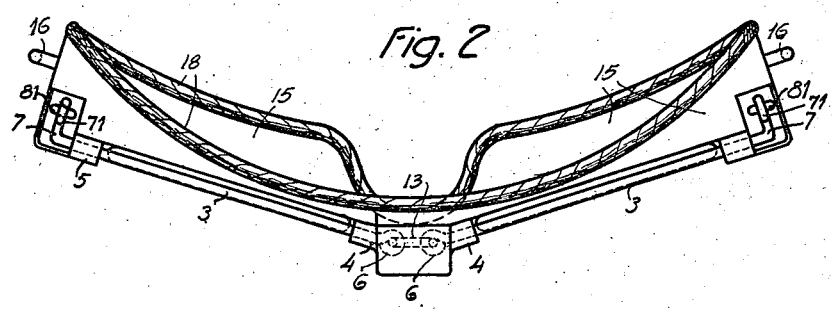
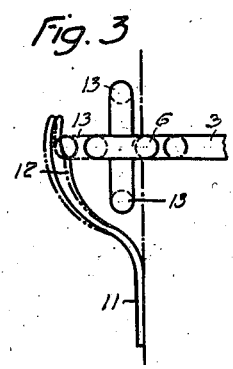
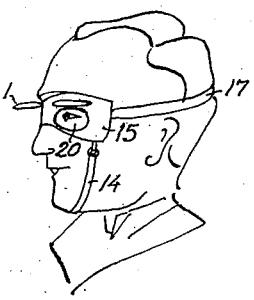
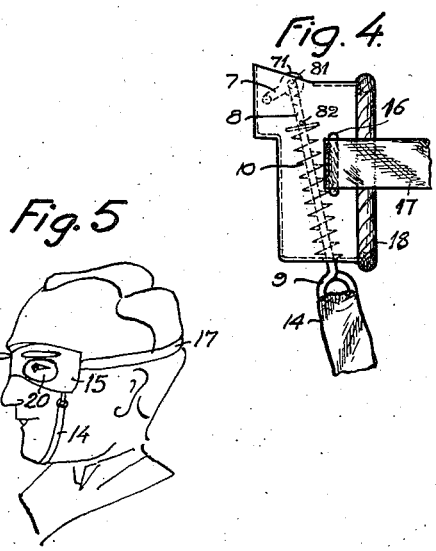
Inventor-
Nils R. G. Ekwall.
By- B. Singer.
Atty.

UNITED STATES PATENT OFFICE.

NILS RICHARD GÖSTA EKWALL, OF HALMSTAD, SWEDEN.

PROTECTIVE GLASSES FOR FLYERS, CASTERS, WELDERS, ETC.

1,415,536.      Specification of Letters Patent.      Patented May 9, 1922.

Application filed January 11, 1921. Serial No. 436,536.

*To all whom it may concern:*

Be it known that I, NILS RICHARD GÖSTA EKWALL, a subject of the King of Sweden, residing at the town of Halmstad, in the Kingdom of Sweden, (pro tempore in Gothenburg,) have invented new and useful Protective Glasses for Flyers, Casters, Welders, etc., of which the following is a specification.

My invention relates to improvements in protective glasses for flyers, casters, welders, motor-cyclists, etc. The object of my improvements is to enable the person who wears these glasses to lift or open them when desired without using the hands for the purpose, so as to render it possible to see direct without glasses such objects which can not be seen well through the glasses, or to let in the air momentarily behind the glasses when they are covered with damp so as to cause this damp to evaporate. Means are provided to secure the glasses in the open position, when so desired, and to release them from said means so as to be shut automatically, and all these operations are performed by movements of the chin so that the hands need not assist in any way.

The glasses may be simple or double or manifold and some of them may be colored and other uncolored or all may be colored, and one or more or all pairs may be movable or one or more glasses for one eye may be movable and the glass or glasses for the other eye fixed, and the movable glass or glasses or pair or pairs of movable glasses may be movable or swingable in any direction (say upwards or sidewise), and the movement may be full so as to uncover the entire range of vision or partial so as to leave a portion covered and enable the wearer to see both direct through the open portion and indirect through the glass or glasses simultaneously.

In the drawing, which shows an example with the glasses for both eyes movable,

Fig. 1 is a front view

Fig. 2 a plan view and

Fig. 4 a side view.

Fig. 3 shows on a larger scale a means for securing the glass or glasses in open position.

Fig. 5 shows the operation in use.

The glasses 1 with their mountings 2 are fastened each on a slender shaft 3. These shafts which may consist of wires or the like are turnable in bearings 4, 5 on the frame 15 and their meeting ends have each an eye 6, which eyes are connected by a common ring 13 or the like so as to cooperate like an universal joint. The other end 7 of each shaft is bent 90° so as to serve as an arm. This also has an eye 71 which connects the upper end 81 of a link 8 passed through a hole in bottom of frame 15 and ending with an eye 9 or the like for connecting a strap 14 adapted to pass under the chin. Springs 10 passed on the links 8 and pressing on said bottom and on a pin 82 or collar or other shoulder on the links tend to keep the glasses closed.

A strap 17 connected to each end of frame 15 by lugs 16 or any other suitable means and passed round the head will keep the frame in position in front of the eyes. Those edges of the frame which rest on the face may be lined with shammy 18 or the like.

When lowering the chin so as to pull the links 8 down and thereby compressing the springs 10 the shafts 3 will turn in their bearings and swing the glasses upwards thereby uncovering the openings 20 in the front of the frame so that the wearer can see direct without the glasses. When raising the chin to its normal position the glasses will swing down by their own weight and the springs 10 will press them tightly against the edges of the openings 20.

Referring to Figs. 1 and 3 a spring 11 fixed at the centre of the front side of the frame and bent as shown has a slight inward projection 12 so disposed that the ring 13, when the glasses are moving to the open position, will slide thereon and thereby bend the spring 11 outwards from the position shown in full lines until the ring 13 has passed the projection so that the spring can return, not however to the fully drafted position but to the dotted position with the ring 13 resting on the upper side of the projection.

If the wearer then raises the chin the glasses will remain open as the spring 11 is a trifle stronger than the springs 10.

For now shutting the glasses the wearer has to lower the chin a little deeper than before (so that the ring 13 turns upwards a distance above the projection 12) and rapidly raise the chin so that the momentum of the falling glasses will help the springs 10 to overcome the resistance of spring 11 when the ring 13 during its down stroke passes the projection 12.

If only the glass for one eye should be movable the same construction may be used with the exception that one of the shafts 3 has no glass fastened to it.

Of course a single straight shaft can be used instead of the two shafts 3 and the ring 13 or other member coacting with the spring 11 may then be rigid on said shaft.

By using two shafts 3 forming an angle with each other as shown the glasses come nearer to the eyes which results in a larger range of vision.

Claims:

1. Protective glasses comprising a frame adapted to be held in front of the eyes and movable glass or glasses on said frame, and means to move said glass or glasses by movements of the chin.

2. Protective glasses comprising a frame to be tied on the head in front of the eyes, openings on said frame, glasses adapted to close said openings, said glasses being fixed on a turnable shaft mounted on said frame, one or two arms on said shaft and a flexible connection between said arms adapted to be passed under the chin, so as to open the glass or glasses by a movement of the chin.

3. Protective glasses comprising a frame having openings to be shut by glasses fixed on turnable shafts, arms on said shaft, links connected to said arms and adapted to slide in said frame and engaged by springs which tend to shut the glasses, a flexible connection between said links, adapted to be pulled by the chin so as to open the glasses, and means for keeping the glasses in open position.

4. Protective glasses consisting of a frame with two turnable shafts connected by a ring, a glass fixed to each shaft, an arm on each shaft, links connected to the arms, a strap connected to the links, springs on the links, a brake spring on the frame adapted to engage the ring when opening the glasses so as to keep them in open position said spring being so adjusted that the momentum of the falling glasses assisted by the link springs will overcome the resistance of said brake spring.

NILS RICHARD GÖSTA EKWALL.

Witnesses:
 STEN TORPMOG,
 CURE HOLM.